(12) United States Patent
Tallapaneni et al.

(10) Patent No.: US 12,537,991 B2
(45) Date of Patent: *Jan. 27, 2026

(54) SYSTEMS AND METHODS FOR MITIGATING RADIO-FREQUENCY LATENCY WIRELESS DEVICES

(71) Applicant: VIZIO, INC., Irvine, CA (US)

(72) Inventors: Kishore Tallapaneni, Flower Mound, TX (US); Maksym Shestirko, Addison, TX (US); Rammohan Somalraju, Irving, TX (US); Oleksandr Blazhko, Des Plaines, IL (US); W. Leo Hoarty, Morgan Hill, CA (US)

(73) Assignee: VIZIO, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,740

(22) Filed: Apr. 23, 2024

(65) Prior Publication Data

US 2024/0276054 A1   Aug. 15, 2024

Related U.S. Application Data

(63) Continuation of application No. 17/981,209, filed on Nov. 4, 2022, now Pat. No. 11,997,343.

(60) Provisional application No. 63/399,806, filed on Aug. 22, 2022, provisional application No. 63/280,776, filed on Nov. 18, 2021.

(51) Int. Cl.
*H04N 21/43* (2011.01)
*H04B 17/364* (2015.01)
*H04N 21/433* (2011.01)
*H04N 21/4363* (2011.01)

(52) U.S. Cl.
CPC ....... *H04N 21/4307* (2013.01); *H04B 17/364* (2015.01); *H04N 21/433* (2013.01); *H04N 21/43637* (2013.01)

(58) Field of Classification Search
CPC ............ H04N 21/4307; H04N 21/433; H04N 21/43637; H04N 21/43072; H04N 21/43076; H04B 17/364; H04L 65/1046; H04L 65/1069; H04L 65/612; H04L 65/80

See application file for complete search history.

(56) References Cited

U.S. PATENT DOCUMENTS

2015/0381830 A1* 12/2015 Wu ................... H04N 21/43637
                                                           348/207.1
2019/0098293 A1*  3/2019 Lee ........................ H04N 17/04
2019/0116395 A1*  4/2019 Kerdranvat .......... H04N 21/439

* cited by examiner

*Primary Examiner* — Oschta I Montoya
(74) *Attorney, Agent, or Firm* — POLSINELLI LLP

(57) ABSTRACT

Systems and method are provided for detecting latency in radio frequency connections. A computing device can detect, at a first time, light using an optical sensor and receive, at a second time, a first data packet over a connection with a first wireless device. The computing device may define a first signal latency value based on the first time and the second time. The computing device may then receive a media stream that includes a video component and an audio component and modify a presentation of the media stream by delaying the video component by a time interval based on the first signal latency value.

20 Claims, 11 Drawing Sheets

SYSTEMS AND METHODS FOR MITIGATING RADIO-FREQUENCY LATENCY WIRELESS DEVICES

CROSS-REFERENCE TO RELATED APPLICATIONS

This application is a continuation of U.S. patent application Ser. No. 17/981,209 filed Nov. 4, 2022, which claims the benefit of priority to U.S. Provisional Patent Application No. 63/280,776 filed Nov. 18, 2021, and to U.S. Provisional Patent Application No. 63/399,806 filed Aug. 22, 2022, which are all incorporated herein by reference in their entirety for all purposes.

TECHNICAL FIELD

This disclosure relates generally to detecting radio-frequency signal latency, and more particularly to mitigation processes for radio-frequency signal latency between wireless devices.

BACKGROUND

Signal latency in a connection between wireless devices may be caused by a variety of sources such as the distance between the wireless devices, environmental factors (e.g., atmospheric conditions, humidity, surfaces between the wireless device and the signal source, etc.), noise, etc. The severity of the effect of the signal latency on the operations of the wireless devices may depend on the wireless devices. For example, internet-of-things devices may not be impacted by small delay in transmission time between devices. However, signal latency may have a large impact on time-sensitive operations such as when the operations of wireless devices operate in a synchronized manner.

SUMMARY

Methods and systems are described herein for mitigating signal latency in radio frequency connections. The methods include: detecting, at a first time, light using an optical sensor; receiving, at a second time, a first data packet over a connection with a first wireless device; defining a first signal latency value based on the first time and the second time; receiving a media stream that includes a video component and an audio component; and modifying a presentation of the media stream by delaying the video component by a time interval based on the first signal latency value.

The systems described herein may mitigate signal latency in radio frequency connections. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
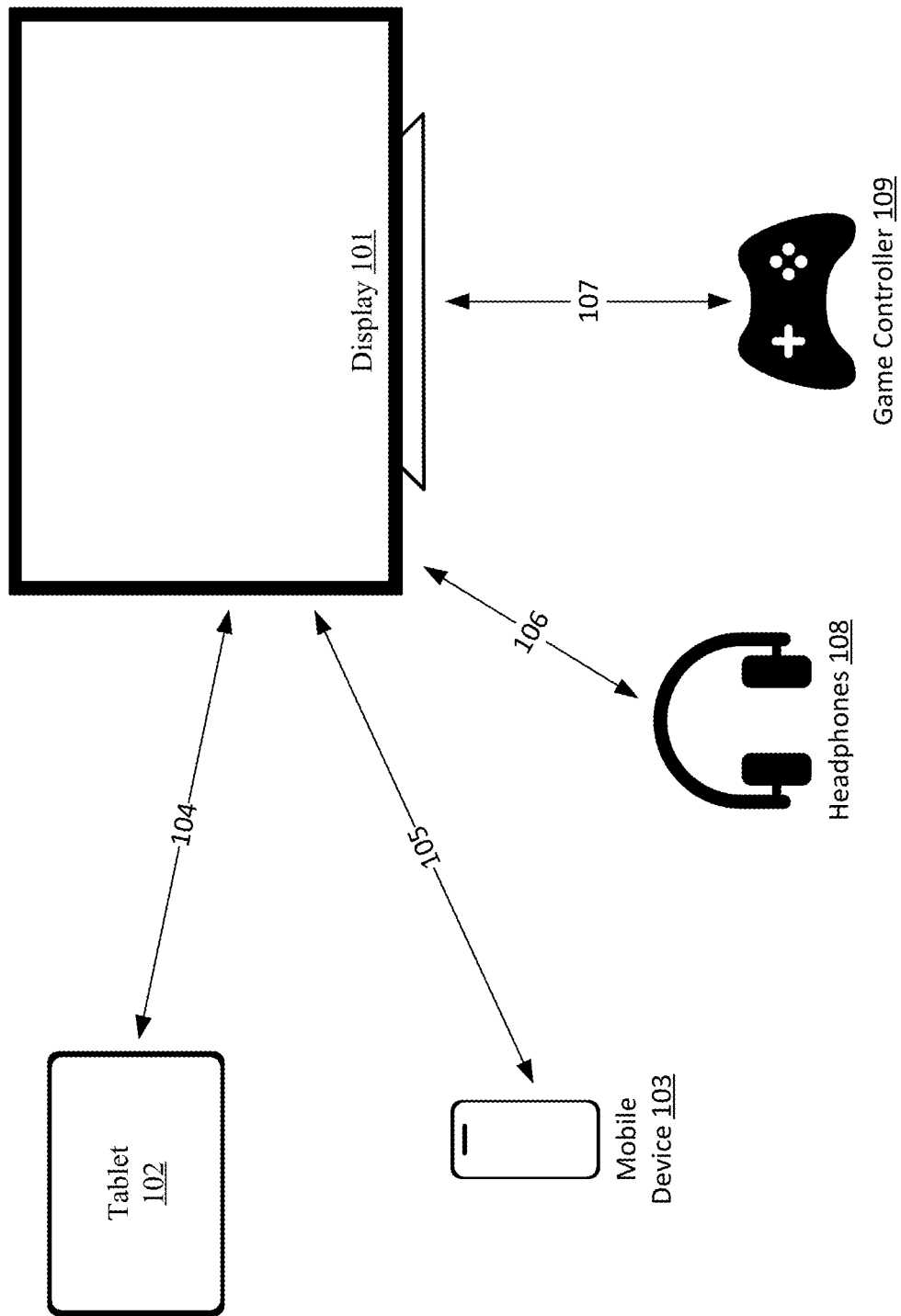
FIG. 1 illustrates an example system in which signal latency can be detected and mitigated in connections with wireless devices according to aspects of the present disclosure.

Signal latency (e.g., time interval between when a signal is transmitted to the signal is received or when the receive signal is processed) may affect the operability of wireless devices (e.g., such as time sensitive operations, etc.). For example, Bluetooth headphones may be connected to a display device to present an audio component of video being presented by the display device. Signal latency between the display device and the headphones may cause the audio being presented to lag behind the corresponding video displayed by the display device. Signal latency may be caused by a distance between the wireless device and the signal source, the environment (e.g., surfaces between the wireless device and the signal source, material composition of those surfaces, etc.), atmospheric conditions, noise, error correction methodologies, and/or the like.

The present disclosure includes systems and methods for detecting and mitigating signal latency within wireless devices. Signal latency may be detected according to one or more detection process selected based on the capabilities of the transmitting and/or receiving device. In some instances, the capabilities of a first device and/or a second device may be detected using communications transmitted to and/or from the respective devices. For example, data within the communications and/or characteristics of the transmissions may be used to identify the transmitting device, which may in turn be used to determine the capabilities of the transmitting device. A detection process may then be selected and executed based on the detected capabilities.

The detection process may derive one or more signal latency measurements from communications between transmitted between the first service and second device. The one or more signal latency measurements may be used to derive an overall signal latency that characterizes the connection between the first device and the second device. The overall signal latency may be a statistical representation of the one or more signal latency measurements such as, but not limited to, a mean signal latency measurement, a median signal latency measurement, a mode signal latency measurement, etc.

One or more mitigation processes may then be defined that when executed modify the operations of the first device and/or the second device to reduce or eliminate the effect of the signal latency. The one or more mitigation processes may be defined based on the overall signal latency, the capabilities of the first device, the capabilities of the second device, the operations to be provided by the first device and/or the second device, and/or the like. The mitigation process may be defined by a remote device, the first device, and/or the second device. Once defined, the one or more mitigation processes may be transmitted to the first device and/or the second device to modify the operations of the first device and/or the second device respectively. Alternatively, the one or more mitigation processes may be predefined. In those instances, the first device and/or the second device may receive a communication that includes an identification of the one or more mitigation processes that are to be executed, a first timestamp or time interval indicating when the one or more mitigation processes are to be executed, an identification of an event and/or second timestamp indicating when the operations of the device are to revert to pre-mitigation process operations, and/or the like. The first device and/or the second device may receive the communication, identify the one or more mitigation processes in memory (or otherwise obtain them from a local or remote database), and execute the one or more mitigation processes according to the first timestamp or time interval.

In an illustrative example, wireless headphones may be paired with a computing device to present an audio component of video displayed by computing device. The computing device may identify the wireless headphones based on communications transmitted to the computing device and/or characteristics of the communications transmitted to the computing device. For example, the computing device may receive a device identifier and use a look up table to identify the wireless headphones from the device identifier. The computing device may then identify the capabilities of the wireless headphones (e.g., quantity and/or types of wireless transceivers, sensors, speakers, etc.) to define one or more detection processes for the connection between the wireless headphones and the computing device. The computing device may transmit the one or more detection processes to the wireless headphones, execute the one or more detection processes, and/or display instructions to execute the one or more detection processes.

In some examples, the detection process may include a new device connected to the computing device. The new device may be a mobile device (e.g., such as smartphone, laptop, etc.) configured to receive communications, sensor data, etc. The new device may be connected to the computing device (e.g., via a same wireless protocol as the wireless headphones). The new device may generate an output (e.g., audio, flash of light, etc.) and simultaneously transmit a data packet to the computing device. The computing device may detect the output and start a timer. When the computing device receives the data packet, the computing device may terminate the timer and determine a timer value (e.g., the value of the timer when the timer is terminated). The timer value may correspond to the signal latency.

In some instances, the computing device may then perform a reciprocal version of the detection process to improve the accuracy of the detection process. The computing device may generate an output and transmit a data packet to the new device. The new device may start a timer upon detecting the output and stop the timer when the corresponding data packet is received. The timer value when the timer is terminated may correspond to the signal latency. The two signal latency values may be averaged or further processed to derive an overall signal latency value characterizing the connection between the new device and the computing device. Since the signal latency of the connection between the computing device and the wireless headphones is approximately the same as the signal latency between the computing device and the new device, the computing device may determine that the overall signal latency value also characterizes the connection between the computing device and the wireless headphones.

In some examples, the detection process may be executed based on sensors (e.g., a microphone, etc.) of the wireless headphones. The computing device may generate an output that may be detected by a sensor of the wireless headphones (or any other wireless device for which the detection process may be executed). For example, the computing device may generate a tone that can be detected by a sound sensor of the wireless microphones and simultaneously start a timer. The microphone of the wireless headphones may detect the sound causing the wireless headphones to transmit a data packet to the computing device. When the computing device receives the data packet, the computing device may stop the timer. The timer value when the timer is stopped may correspond to the signal latency of the connection between the wireless headphones and the computing device.

If the wireless device includes an optical sensor, then computing device may use light instead of sound. The computing device may generate an output and approximately simultaneously initiate the timer. The output may be visual (e.g., a flash of light using a camera flash, a set of white pixels, a symbol, etc.) or non-visual (e.g., light emitted over non-visual wavelengths of the electromagnetic spectrum such has infrared, etc.). The wireless device may detect the visual input and transmit a communication to the computing device indicating that the flash of light has been detected. When the communication is received, the computing device may stop the timer. The timer value when the timer is stopped may correspond to the signal latency of the connection between the wireless headphones and the computing device.

In some instances, the timer value may correspond to the signal latency. For example, when the computing device derives the signal latency from the time interval between detecting an output and receiving the corresponding data packet, the signal latency may correspond to the timer interval. In other instances, the timer value may be processed to derive the signal latency. For example, the timer value may be adjusted to account for the processing time of the wireless device. The processing time may correspond to a time interval between receiving the output from the computing device and the transmitting the communication indicating that the output has been detected. The processing time may increase the timer value such that the timer value may correspond to the signal latency plus the processing time. When presenting media, only the signal latency may affect the operations of the wireless headphones. The computing device may account for the processing latency by reducing the timer value by a predetermined quantity based on the capabilities of the wireless device. The predetermined quantity may be based on the capabilities of the wireless device, a predetermined value according to device type, based on user input, and/or the like.

The computing device may then execute a mitigation process in response to deriving the signal latency. The mitigation process may modify how video frames are displayed by delaying the video frames based on the signal latency. In some examples, the computing device may instantiate a video buffer. The size of the video buffer may be based on the signal latency and the frame rate of the computing device or video being displayed. For example, the buffer may store 500 milliseconds of video, which may correspond to 15 video frames of a video configured to be displayed at 30 frames-per-second (FPS). Each time a new video frame is ready for display, the computing device removes the oldest video frame from the buffer, displays the oldest video frame, and stores the new video frame. The buffer causes the video to be delayed, which can synchronize the portion of the video component being displayed with the audio component being presented by the wireless headphones.

Alternatively, the computing device may advance the audio component to synchronize the wireless headphones with the video being displayed by the computing device. Without latency mitigation, when the computing device is displaying the portion of video that corresponds to time T, the wireless headphones may be presenting the audio component that corresponds to time T−x (where x is a time interval that the headphones is delayed by the signal latency). The computing device may mitigate the signal latency by transmitting, at time T, the portion of the audio that corresponding to time T+x (when the computing device is displaying the video corresponding to time T). When the computing device begins displaying the video corresponding to time T+x, the wireless headphones may receive and present the portion of the audio at T+x that it received at time T.

Advancing the audio component may cause some portions of the audio to be omitted from presentation. For example, the portion of the audio between time T and time T+x may not be transmitted to the wireless headphones. The wireless headphones may present the non-advanced audio or no audio during this time interval. Once the mitigation process terminates (e.g., based on user input, the wireless headphones being switched off, etc.), the audio component may begin presenting the portion of the audio that corresponds to the video being displayed. Since the audio portion being presented by the wireless headphones is synchronized with the portion of video being displayed, the audio and video may maintain synchronization.

A first device, a second device, and/or a remote server may dynamically define or select the one or more detection processes and/or the mitigation processes based on the capabilities of the computing device and/or the wireless (e.g., wireless headphones, wireless controller, etc.). The detection and/or mitigation processes may be executed any number of times during the communication session between the computing device and a wireless device. For example, the detection process may execute once (e.g., when the computing device connects to the wireless device, upon receiving user input, etc.), multiple times (e.g., in regular intervals, after a time interval expires, upon receiving user input, etc.), and/or the like. In some examples, the detection process may execute once when facilitated by an external device (e.g., the new device as previously described) to prevent interfering with the presentation of the media or interactive service by the computing device.

The detection process may execute more than once when the detection process can be executed by the computing device or the wireless device without interfering with the operations of the computing device. For example, the computing device may define a detection process that includes transmitting a particular output that can be detected by the wireless device (e.g., such as a particular video frame, flash of light, sound, etc.) while being minimally detectable by the user. The wireless device may detect the output and transmit a data packet. The computing device record the signal latency as the time between generating the output and receiving the data packet. The mitigation process may be executed while the computing device is presenting media and/or operating the interactive service without impacting the presentation of the media or the interactive service. The computing device may periodically execute the detection process or execute the detection process upon detecting a particular event (e.g., such as an event indicative of a change in the signal latency previously measured, etc.).

A mitigation process may be executed each time a detection process executes to synchronize the operations of the wireless device with the computing device. Alternatively, the mitigation process may be executed once, the first time the detection process executes for a particular wireless device. The computing device may execute a subsequent mitigation process upon determining that a change in the measured signal latency value.

FIG. 1 illustrates a block diagram of an example system in which signal latency can be detected and mitigated in connections with wireless devices according to aspects of the present disclosure. Some devices may be configured to extend functionality of the device using one or more connected wireless devices. Computing device 101 may be a device configured to augment operations and/or services of computing device 101 using one or more wireless devices. Computing device 101 may be or include, but is not limited to, personal computers, servers, display devices, mobile devices such as smartphones or tablets, televisions, and/or the like. Computing device 101 may include one or more transceivers configured to connect to tablet 102, mobile device 103 (e.g., smartphone, tablet, mobile computing devices, etc.), wireless headphones 108, wireless game controller 109, and/or the like. The one or more transceivers may be configured to communicate using oner or more wireless protocols such as, but not limited to, Wi-Fi, Bluetooth, Zigbee, Z-wave, etc.

Computing device 101 may establish a connection 104 with tablet 102 and/or connection 105 mobile device 103 using a wireless communication protocol (e.g., such, but not limited to, Bluetooth, Wi-Fi, Zigbee, Z-wave, etc.). Once established, tablet 102 or mobile device 103 may be used to interact with computing device 101 by, for example, controlling the operations of computing device 101 (e.g., changing settings, volume, channels, etc.), mirroring computing device 101 (e.g., causing the media being displayed by computing device 101 to be displayed by tablet 102 and/or mobile device 103, causing the media being displayed by tablet 102 and/or mobile device 103 to be displayed computing device 101, etc.), viewing additional information associated with media being displayed by computing device 101 (e.g., such as information associated with a show or movie, information associated with an advertisement, an advertisement contextually related to the media, etc.), facilitating a connection with other devices (e.g., such as connection 106 with wireless headphones 108, connection 107 with wireless game controller 109, etc.), and/or the like.

Computing device 101 may include some functions that rely on other wireless devices. For example, computing device 101 may establish connection 106 with wireless headphones 108 via a wireless communication protocol. Once connected, computing device 101 may transmit the audio component of media to be presented by computing device 101 to wireless headphones 108 while computing device 101 may present the video component of the media. Connection 106 may unidirectional (e.g., one way from computing device 101 to wireless headphones 108) as shown or bidirectional. In another example, computing device 101 may operate an interactive service such as, but not limited to, a video game service, that may be operated by a user with a controller such wireless game controller 109. Computing device 101 may operate other interactive services that may be operated by the user with other controllers, tablet 102, mobile device 103, and/or other wireless devices.

Computing device 101 may establish connection 107 with wireless game controller via a wireless communication protocol. Once connected, computing device 101 may receiving communications from wireless game controller 109 indicative of activation of one or more controls of wireless game controller 109 (e.g., joystick movement from a previous position of the joystick, a button press, a change in pressure applied to a button, etc.). Computing device 101 may receive the communication and pass the communication to the service, which may process the activation of the one or more controls. The service may output the result of the activation of the one or more controls to the display of computing device 101. Connection 107 may be unidirectional (e.g., one way from wireless game controller 109 to computing device 101) as shown or bidirectional.

The quality of some operations of computing device 101 may be impacted by the nature of wireless communications. Synchronization or time sensitive applications may be impacted by signal latency which may when or how communications can be processed from wireless devices. Signal latency may occur due to characteristics of the wireless protocol being used, interference (e.g., due other devices or noise broadcasting or the same or nearby frequencies, environmental conditions, objects within the environment that may impede or radio frequency signals, etc.), a distance between the wireless device and computing device 101, etc.

For instance, computing device 101 may establish connection 106 to enable wireless headphones 108 to present the audio component that corresponds to video displayed by computing device 101. Signal latency in connection 106 may cause the audio component to be received by wireless headphones 108 after the corresponding video component is displayed. The audio component may continue to be delayed behind the video component for as long as the wireless headphones 108 are presenting the audio component. Signal latency in connection 106 may cause an indication of a control activation to be received some time after the control activation occurred. For time-sensitive application (e.g., such as some video games, etc.), this may prevent wireless game controller 109 from being usable with the interactive service. For example, the interactive service may include a video game in which the user controls an avatar jumping across a series of platforms. The control activation may occur when the avatar is at the edge of one such platform. The avatar may fall off the platform before the indication of the control activation is received due to the signal latency induced delay.

Computing device 101 may execute a signal-latency detection processes and/or signal latency mitigation processes configured to adjust the operations of computing device 101 and/or the wireless devices connected to computing device 101 to reduce and/or eliminate the effect of the signal latency.

Figure 2:
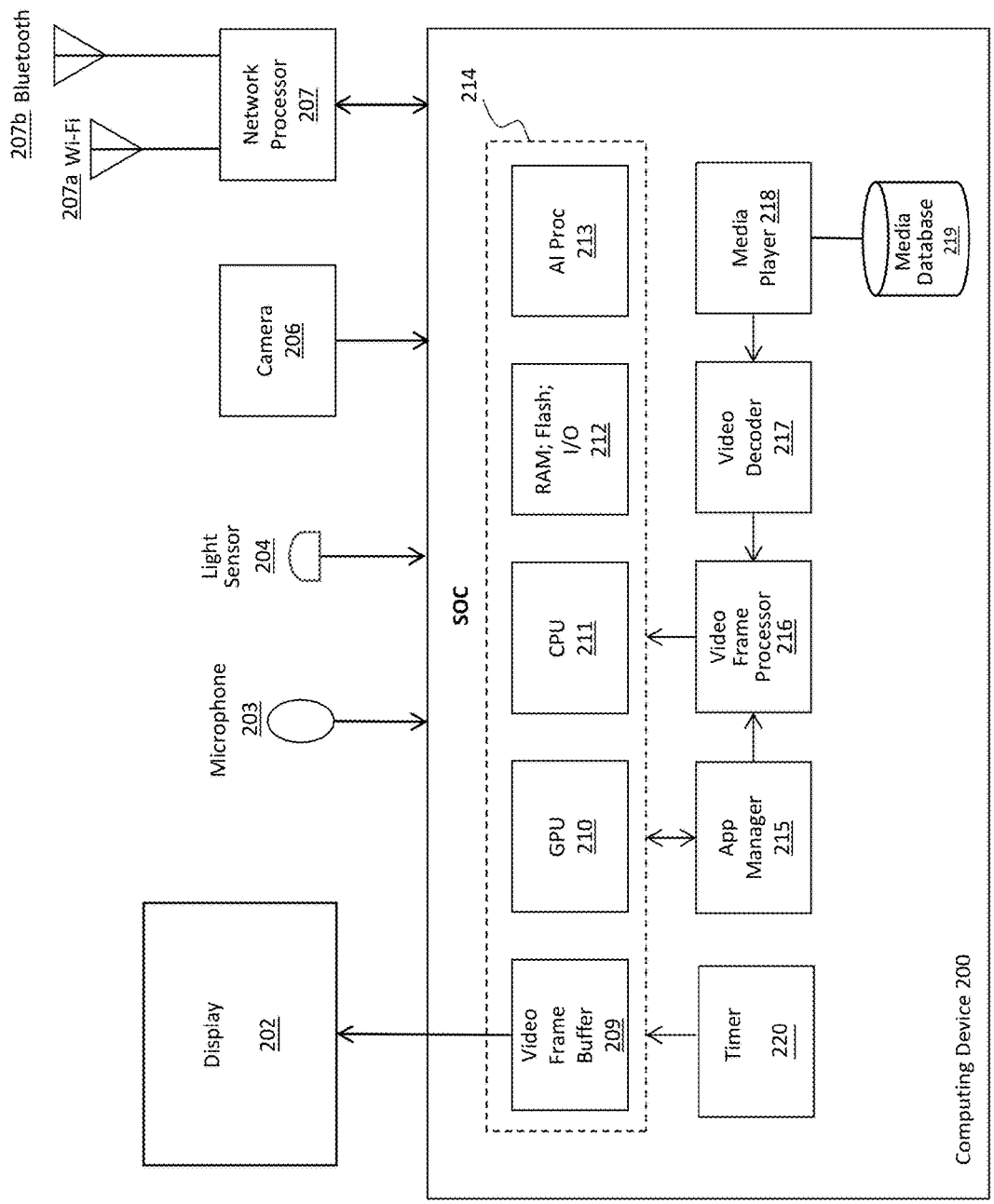
FIG. 2 illustrates a block diagram of an example computing device configured to detect and mitigate signal latency in wireless devices connected to the computing device according to aspects of the present disclosure.

FIG. 2 illustrates a block diagram of an example computing device configured to detect and mitigate signal latency in wireless devices connected to the computing device according to aspects of the present disclosure. Computing device 200 may include one or processing components (e.g., system-on-a-chip, central processing units, application-specific integrated circuits, field programmable gate arrays, and/or the like), memories (e.g., volatile and non-volatile memories, databases, etc.), network processors 207 (e.g., including Wi-Fi 207a, Bluetooth 207b, and/or other transceivers, etc.), and one or more sensors. The sensors may include, but are not limited to, microphone 203, light sensor 204, camera 206, one or more motion-based sensor (e.g., accelerometers, gyroscopes, and/or the like) (not shown). The sensors may be used to detect a response to an output (e.g., for signal latency detection and/or mitigation processes, etc.), detect a state of an environment (e.g., to determine a cause or magnitude of the signal latency, etc.), and/or the like.

Computing device may be configured to present media to one or more users using display 202 and/or one or more wireless devices connective via network processor 207. The video component may be presented via display 202 and/or one or more other displays (e.g., such as other display devices, mobile devices, tablets, and/or the like), while the audio component may be presented via one or more speakers (not shown), one or more wireless devices through network processor 207 (e.g., wireless speakers, headphones, or the like). Computing device 200 may retrieve the media from media database 219 (or alternatively receiving media from one or more broadcast sources, an external device, etc.). The media may be loaded by media player 218, which may process the media based on the container of the video (e.g., MPEG-4, QuickTime Movie, Wavefile Audio File Format, Audio Video Interleave, etc.). Media player 218 may pass the media to video decoder 217, which decodes the video into a sequence of video frames that can be displayed by display 202. The sequence of video frames may be passed to video frame processor 216 in preparation for display. Alternatively, media may be generated by an interactive service operating within app manager 215. App manager 215 may pass the sequence of frames generated by the interactive service to video frame processor 216.

The sequence of video frames may be passed to system-on-a-chip (SOC) 214. SOC 214 may include processing components configured to enable the presentation of the sequence of video components and/or audio components. SOC 214 may include central processing unit (CPU) 211, graphics processing unit (GPU) 210, volatile memories (e.g., random access memory), non-volatile memory (e.g., such as flash, etc.), input/output interfaces (e.g., collectively, the volatile memory, non-volatile memory, and input/output interfaces correspond to block 212), an artificial intelligence processor 213 (e.g., including one or more machine-learning models, training datasets, feature extractors, etc.), and video frame buffer 209.

In examples in which one or more wireless devices are being utilized to present the media, computing device 200 may use network processor 207 to connect to one or more wireless devices (e.g., such as headphone or wireless speakers, etc.), one or more wireless controllers (e.g., video game controllers, etc.), and/or the like. Once connected, computing device 200 may execute one or more detection processes to determine a signal latency associated with the connection with each wireless device. For example, computing device 200 may transmit an output while simultaneously transmitting a data packet. The wireless device may detect the output and start a timer. The timer may be stopped once the corresponding data packet is received. The timer may be indicative of the signal latency of the connection. Alternatively, or additionally, the wireless device may generate an output and simultaneously transmit a data packet. Computing device may initiate a timer using timer 220 when the output is detected. The timer may be terminated when computing device 200 receives the corresponding data packet. The recorded state of the timer may correspond to the signal latency of the connection between computing device 200 and the wireless device. The signal latency may correspond to a time interval delay between when a signal is transmitted and when it is received and/or processed by the recipient device. The detection process may be defined based on the capabilities of computing device 200 and each respective wireless device. In some instances, the detection process may include the use of another wireless device (e.g., such as a device having additional or alternative capabilities, etc.).

The computing device may then execute a mitigation process configured to reduce or eliminate the effect of the signal latency. The mitigation process may be defined based on the detected signal latency, the wireless device, the service being provided by computing device 200 (e.g., such as presentation of audio, video, audio and video, a video game, etc.), and/or the like. In some examples, the mitigation process may synchronize the portion of the media presented by the wireless devices with the portion of the media presented by the computing device 200. The computing device may instantiate video frame buffer 209 configured to store a quantity of video frames from the sequence of video frames. The size of video frame buffer 209 may be based on a quantity may be based on the determined signal latency and a frame rate in which the sequence of video frames is to be displayed. Video frame buffer 209 may be a first-in-first-out (FIFO) buffer in which once full, each time a new vide of frame is stored in video frame buffer 209 the oldest video frame is output to display 202 for display.

Storing frames in video frame buffer 209 causes the video portion of the media being displayed to be delayed by a time interval corresponding to the signal latency. The portion of the media being displayed by the wireless devices may be delayed by approximately a same time interval due to the signal latency delaying the transmission from computing device 200 to the wireless devices. By delaying the video portion of the media being displayed, the video portion may be synchronized with the portion of the media being presented by the wireless devices.

In examples in which the computing device operates an interactive service, a mitigation process may be defined to adjust a timestamp associated with each indication of interaction with the interactive service (e.g., activation of a control of a controller, any interaction with the interactive service, etc.). The computing device may store the state of the interactive service in a buffer (not shown). When an indication of an interaction with the interactive service is received by computing device 200, the computing device determines the state of the interactive service at the time in which the interaction occurred (e.g., the current time minus the signal latency time interval). Computing device 200 may then modify the state of the interactive at the time in which the interaction occurred using the received indication of the interaction. Computing device 200 may also modify each subsequent state up to and including the current state of the interactive service causing the interactive service to be synchronized with wireless devices without being affected by the signal latency of each respective connection with wireless devices.

Figure 3:
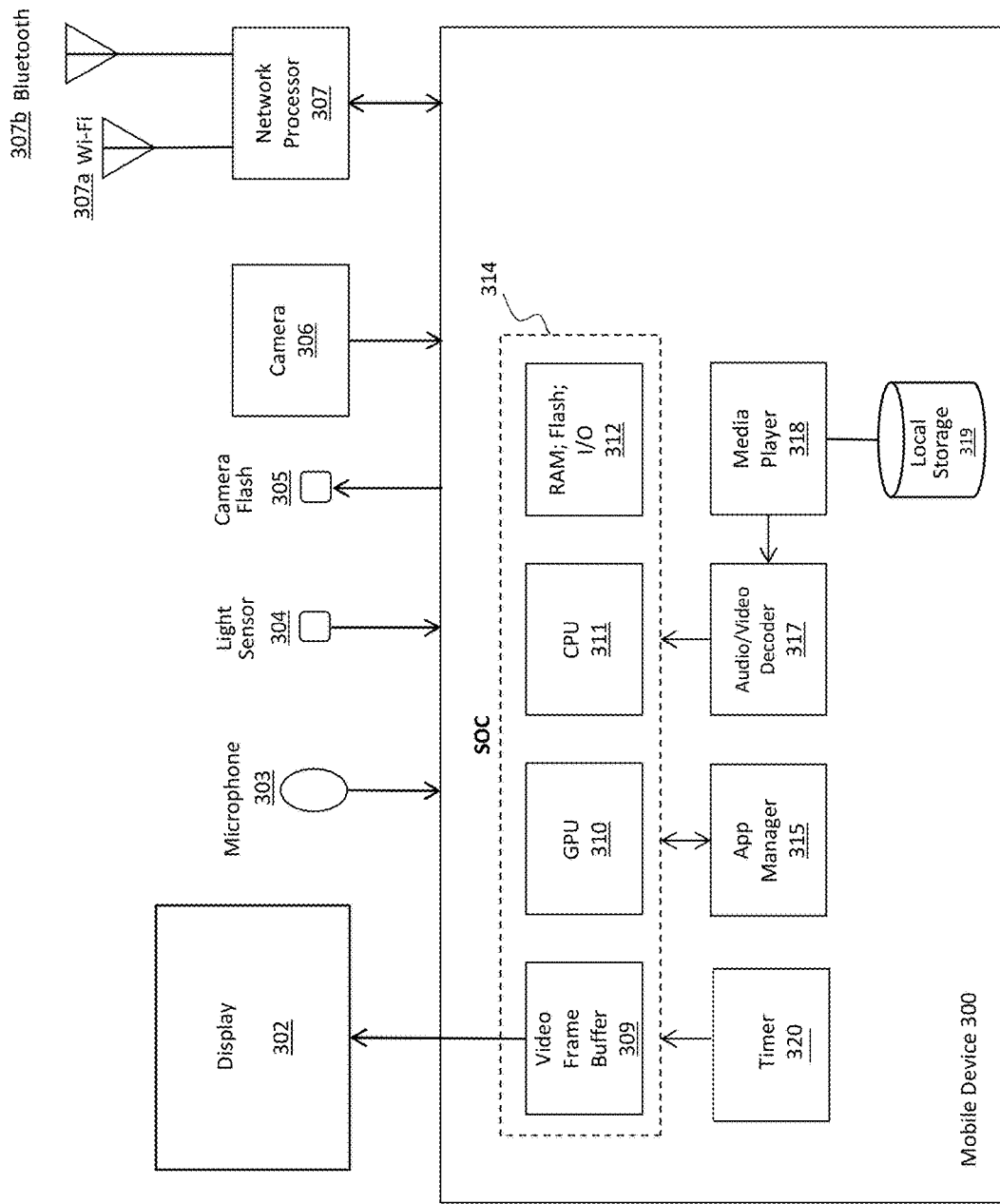
FIG. 3 illustrates a block diagram of an example mobile device configured to detect and mitigate signal latency in wireless devices connected to the computing device according to aspects of the present disclosure.

FIG. 3 illustrates a block diagram of an example mobile device configured to detect and mitigate signal latency in wireless devices connected to the computing device according to aspects of the present disclosure. Mobile device 300 may include one or more components configured to detect and/or mitigate signal latency in connections between mobile device 300 and other devices. The one or more components may provide similar functionality as the components described in connection with computing device 200 of FIG. 2. For example, mobile device 300 may include local storage 319 configured to store media to be presented on display 302 of mobile device 300. Media player 318 may load the media from local storage 319 or receive a media stream from a remote source (e.g., such as broadcast television, a streaming service, etc.). Media player 318 may pass the media to audio/video decoder 317, which may decode the audio component and/or the video component of the media. The audio component and/or video component may be passed to CPU 311 of SOC 314 for presentation. If an interactive service is being presented, then the interactive service executing with app manager 315 may generate the video and/or audio components using GPU 310 and CPU 311.

Mobile device 300 may be configured to determine a signal latency of connections maintained by mobile device 300. Mobile device 300 may establish connections one or more wireless devices using network processor 307 (e.g., via Wi-FI 307a, Bluetooth 307b, and/or other wireless protocols). Once a connection is established with a wireless device, mobile device 300 may use clock 320 to determine the signal latency of the connection using one or more of the detection processes as previously described. For instance, mobile device 300 may use camera flash 305 to generate a flash of light while simultaneously transmitting a data packet to a wireless device (e.g., such as a display device, etc.). The wireless device may detect the flash of light and start a timer. The timer may be stopped once the corresponding data packet is received. The wireless device may transmit the timer value to mobile device 300 and/or the process may be executed in reverse to generate another signal latency. For example, the wireless device may generate an output and transmit a data packet. Mobile device 300 using clock 320 may determine the signal latency corresponds to the time interval between detecting the output and receiving the data packet. The signal latency may be stored in memory for use executing a mitigation process for the connection.

Mobile device 300 may be configured to determine a signal latency for communications between mobile device 300 and other wireless devices. Alternatively, or additionally, mobile device 300 may be configured to approximate the signal latency of a connection between a first device (e.g., such as a display device, computing device, etc.) and a second device (e.g., such as wireless headphone, etc.). Mobile device 300 may connect to the first device and execute a detection process. Mobile device 300 and/or the first device may determine a signal latency value from the detection process. Since the signal latency between the first device and mobile device 300 may be approximately the same. The first device may determine that the signal latency of the connection between the first device and the second device corresponds to the measured signal latency of the connection between the first device and mobile device 300.

Figure 4:
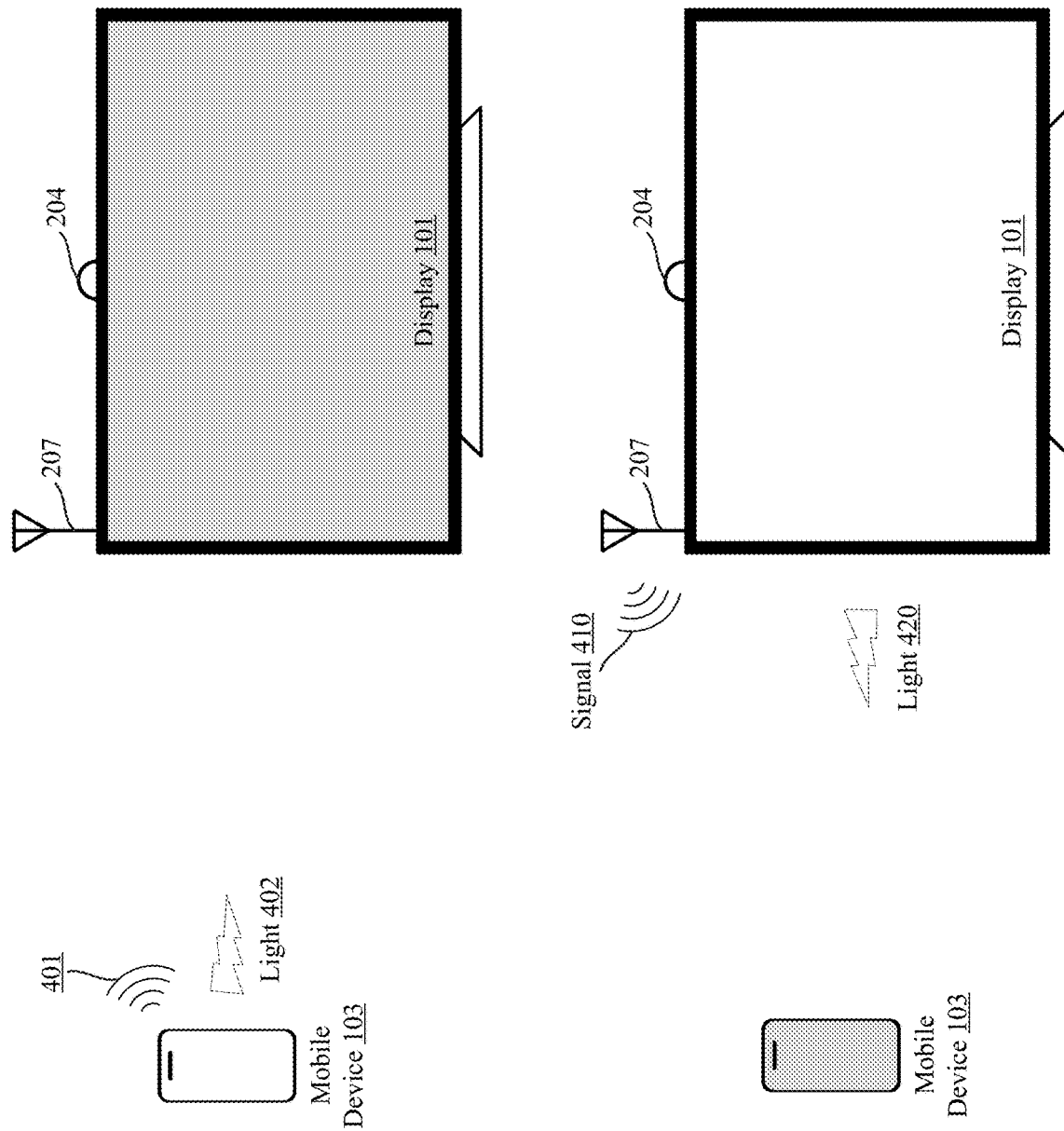
FIG. 4 illustrates an example system for detecting signal latency in a connection between two devices according to aspects of the present disclosure.

FIG. 4 illustrates a block diagram of an example system for detecting signal latency in a connection between two devices according to aspects of the present disclosure. Mobile device 103 may connect to computing device 101 (e.g., via Bluetooth, Wi-Fi, and/or the like). Upon connecting, computing device 101 may execute a detection process to determine the signal latency of the connection with mobile device 103. Mobile device 103 may generate an output (e.g., light 402, audio, video, a symbol, etc.) and transmit a data packet (e.g., signal 401). Computing device 101 may detect the output (e.g., using a microphone for audio, light sensor or camera for light, machine-learning or other object detection algorithm for symbols, etc.) and start a timer. The timer may run until computing device 101 receives the corresponding data packet. The timer value at the time when the data packet is received may correspond to the signal latency of the connection.

Alternatively, or additionally, computing device 101 may execute the detection process by generating an output (e.g., light 402, audio, video, a symbol, etc.) and simultaneously transmitting a data packet (e.g., signal 410). Mobile device 103 may detect the output (e.g., using a microphone for audio, photo detector or camera for light, machine-learning or other object detection algorithm for symbols, etc.) and start a timer. The timer may run until mobile device 103 receives the corresponding data packet. The timer value at the time when the data packet is received may correspond to the signal latency of the connection.

Executing additional detection processes and/or reciprocal detection processes may increase the accuracy of the signal latency detection. In those instances, each device may store the measured signal latency determined by that device. Alternatively, if additional detection processes are executed, each device may store an average, median, mode, and/or other derived from the signal latency that characterizes the connection.

Figure 5:
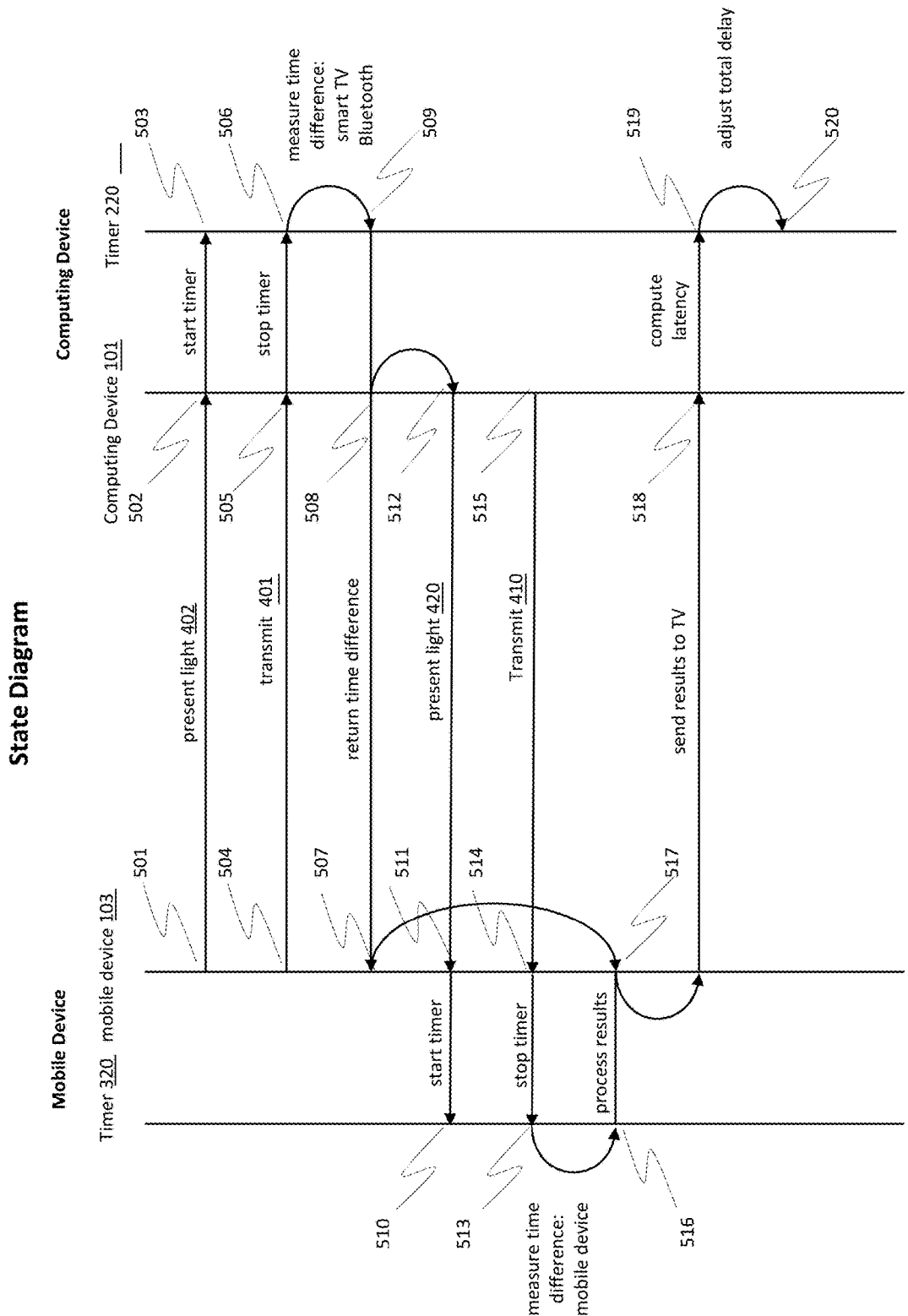
FIG. 5 illustrates a state diagram of an example process for detecting signal latency in a connection between two devices according to aspects of the present disclosure.

FIG. 5 illustrates a state diagram of an example process for detecting signal latency in a connection between two devices according to aspects of the present disclosure. The detection process may be initiated by mobile device 103, computing device 101, or users thereof. The detection process may be initiated upon detecting an event (e.g., such as one device connecting to the other device, etc.), user input, a characteristic of the connection between the mobile device 103 and computing device 101 (e.g., signal quality, quantity or percentage of dropped packets, noise, and/or the like), in regular intervals (e.g., such as every x minutes, etc.), and/or the like. The detection process may begin at 501 when mobile device 103 generates a presentation of light 402 (e.g., displaying a screen including a contiguous set of pixels with an average pixel value of approximately 255, a camera flash, LEDs, and/or the like). Simultaneously, at 504 mobile device 103 may also transmit data packet to computing device 101.

Light 402 may be detected at 502 by computing device 101 causing computing device 101 to initiate timer at 503 using timer 220 of computing device 101. Computing device 101 may receive data packet at 505 and at 506 computing device 101 may stop the timer. The value of the timer corresponds to the time interval between detecting light 402 and receiving data packet (which may also be the time interval over which data packets travel from computing device 101 to mobile device 103). In some instances, at 509, computing device 101 may process the timer value to account for other delays that may be present in the connection (e.g., processing delays, etc.). At 508, computing device 101 may transmit the timer value (or the processed timer value) to mobile device 103, which may be received at 507. Computing device 101 may also store timer value in local memory.

At 512, computing device 101 may initiate a reciprocal detection process (e.g., the same or similar detection process initiated by mobile device 103 at 501, etc.) by generating a presentation of light 420 and simultaneously at 515 transmitting a data packet. The light source may be a camera flash, one or more light emitting diodes, one or more video frames with an average pixel value of approximately 255, etc. Light 420 may be detected at 511 by mobile device 103 causing mobile device 103 to initiate a timer at 510 using timer 320 of mobile device 103. Mobile device 103 may receive data packet at 513 and at 513 mobile device 103 may stop the timer. The value of the timer corresponds to the time interval between detecting light 420 and receiving data packet (which may also be the time interval over which data packets travel from mobile device 103 to computing device 101). In some instances, at 516, mobile device 103 may process the timer value to account for other delays that may affecting the connection (e.g., processing delays, etc.).

Mobile device 103 may also determine if the timer value is accurate (e.g., determining that the timer value is greater than zero, comparing the timer value to the timer value received at 507, comparing the timer value to one or more historical timer values generated from previous detection processes associated with mobile device 103 and computing device 101, using one or more statistical algorithms, and/or the like), and/or the like. For example, if the timer value is greater than a standard deviation from the timer value received at 507, one or more historical timer values, or the like, then the timer value may be discarded, and the detection process may return to 507. At 517, mobile device 103 may transmit the timer value (or the processed timer value) to computing device 101. Mobile device 103 may also store timer value in local memory.

The timer value from mobile device 103 may be received by computing device 101 at 518. At 519, determine a signal latency of the connection between computing device 101 and mobile device 103. The signal latency may correspond to the timer value derived at 509, the timer value derived at 516, and/or an overall timer value derived from the timer value derived at 509 and the timer value derived at 516 (e.g., such as a mean, median, mode, etc. of the two timer values). The signal latency may be used to execute one or more mitigation processes by computing device 101 and/or mobile device 103 such as, but not limited to, delaying a video component to be displayed by computing device 101 to synchronize the video component with an audio component to be presented by mobile device 103 or another wireless device, delaying an audio component that is to be presented by mobile device 103 and/or another wireless device to synchronize the audio component with a video component to be displayed by computing device 101, to synchronize an audio component to be presented by mobile device 103 or another wireless device, modify a service executed by mobile device 103 and/or computing device 101 to cause received interactions to be processed when the interactions occur (rather than when the indication of the interactions are received), etc.

Figure 6:
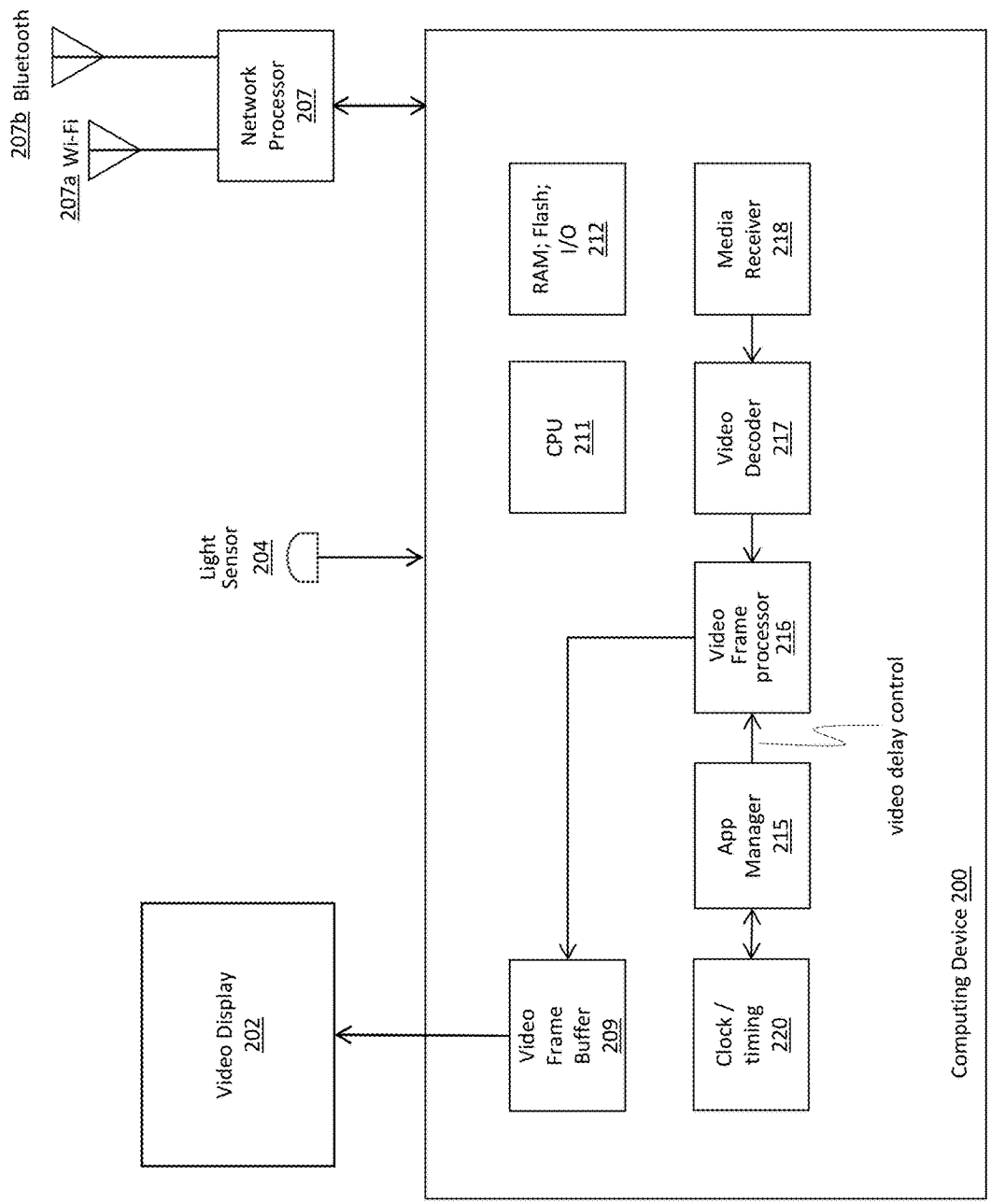
FIG. 6 illustrates an alternative block diagram of the computing device of FIG. 2 configured to mitigate signal latency in wireless devices connected to a computing device according to aspects of the present disclosure.

FIG. 6 illustrates an alternative block diagram of computing device 200 configured to mitigate signal latency in wireless devices connected to the computing device according to aspects of the present disclosure. Computing device 200 may receive a video delay control signal causing a mitigation process to be initiated. The video delay control signal may be output from app manager 215, another component of computing device 200, a remote device, and/or the like. In some examples, video delay control may include an indication of a particular mitigation process that is to be executed (e.g., based on the wireless device connected to computing device 200, a service being provided by computing device 200, and/or the like).

During normal operations, video frame processor 216 may pass video frames to video frame buffer 209, which may present the video frames to display 202. Video frame buffer 209 may store enough frames to be able to stream the video frames to display 202 at a predetermined frame rate consistently. The video delay control signal may cause video frame processor 216 to modify video frame buffer 209 by increasing the size of video frame buffer 209 to store additional video frames. The size may be determined based on the signal latency, the resolution of the video frames, and the frame rate of the media. For example, the size may be determined such that a quantity of video frames may be stored that corresponds to the number of video frames that would be displayed over a time interval equal to the signal latency at the predetermined frame rate.

Alternatively, video frame processor 216 may instantiate a buffer within video frame processor 216 or between video frame processor 216 and video frame buffer 208. The size of the buffer may be based on the signal latency, the resolution of the video frames, and the frame rate of the media as previously described. The buffer may delay the video frames being passed from video frame processor 216 to video frame buffer 209 causing the video being presented by display 202 to be delayed according to the signal latency.

Figure 7:
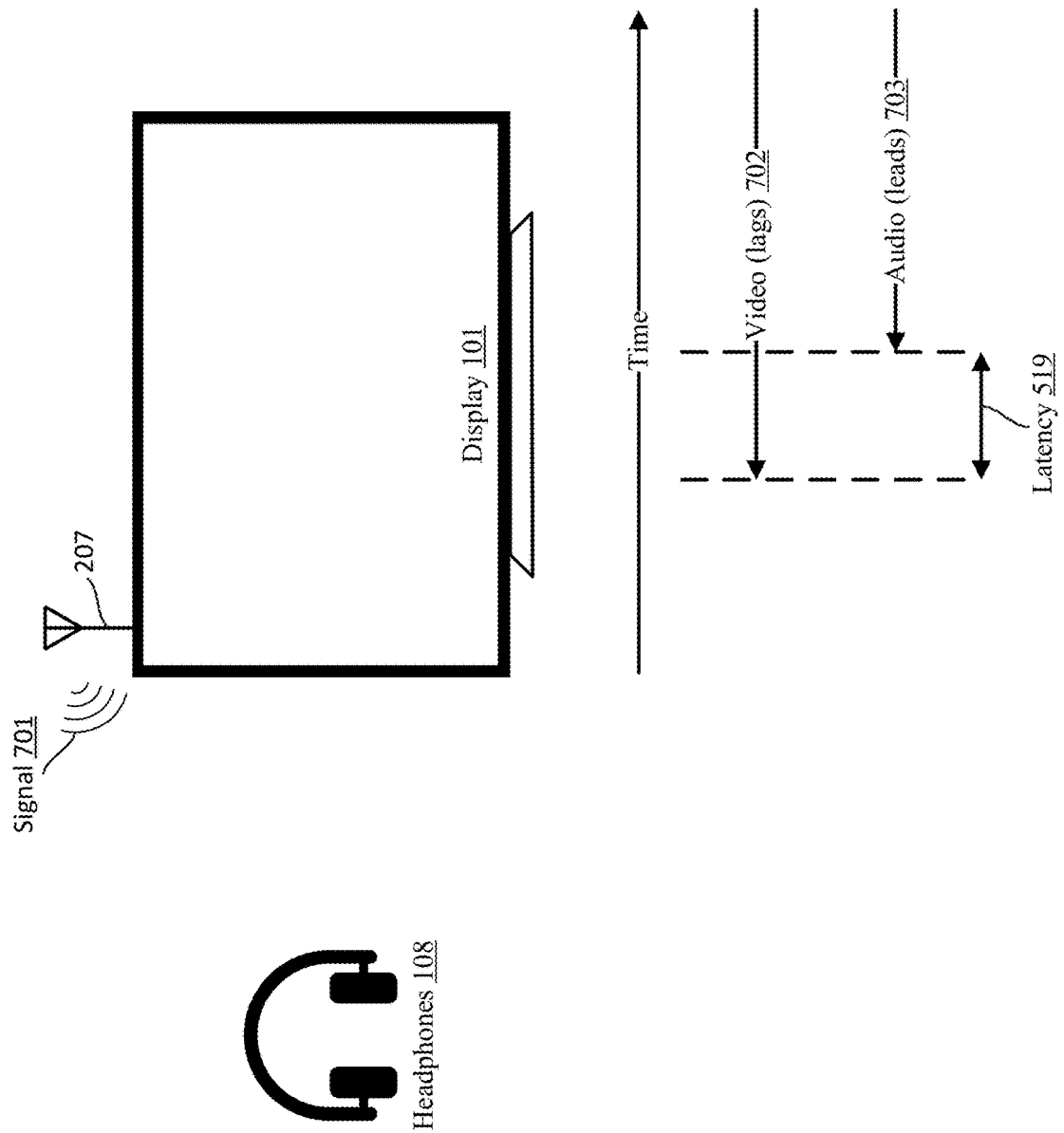
FIG. 7 illustrates an example system for mitigating signal latency in a connection between two devices according to aspects of the present disclosure.

FIG. 7 illustrates a block diagram of an example system for mitigating signal latency in a connection between two devices according to aspects of the present disclosure. Wireless headphones 108 may connect to computing device 101 via Bluetooth, Wi-Fi, and/or the like. Wireless headphones may be configured to present an audio component of media, while computing device 101 may be configured to present the video component of the media. Signal latency caused by the time interval between transmitting data by computing device 101 and receiving the data by wireless headphones 108 may cause the audio component to be delayed behind the corresponding video component displayed by computing device 101, which may affect the presentation of media by computing device 101 and wireless headphones 108.

Wireless headphones 108 and/or computing device 101 may compensate for the signal latency by executing a mitigation process configured to adjust the operation of computing device 101 and/or wireless headphones 108. Wireless headphones 108 and/or computing device 101 may determine a signal latency of the connection between wireless headphones 108 and computing device 101. In some examples, computing device 101 may then execute the mitigation process by delaying the presentation of video based on the signal latency. For example, computing device 101 may display the video component and simultaneously transmit the audio component that corresponds to that video component to wireless headphones 108. Due to the signal latency, the audio component may be received by wireless headphones 108 after the corresponding video component is displayed. Upon executing the mitigation process, computing device 101 delays the video component. Computing device 101 may prepare video component 702 while transmitting signal 701 including audio component 703. The display of video component 702 may be delayed providing audio component 703 time to be received by wireless headphones 108. When video component 702 is displayed, the corresponding audio component 703 will be synchronized with video component 702.

Figure 8A:
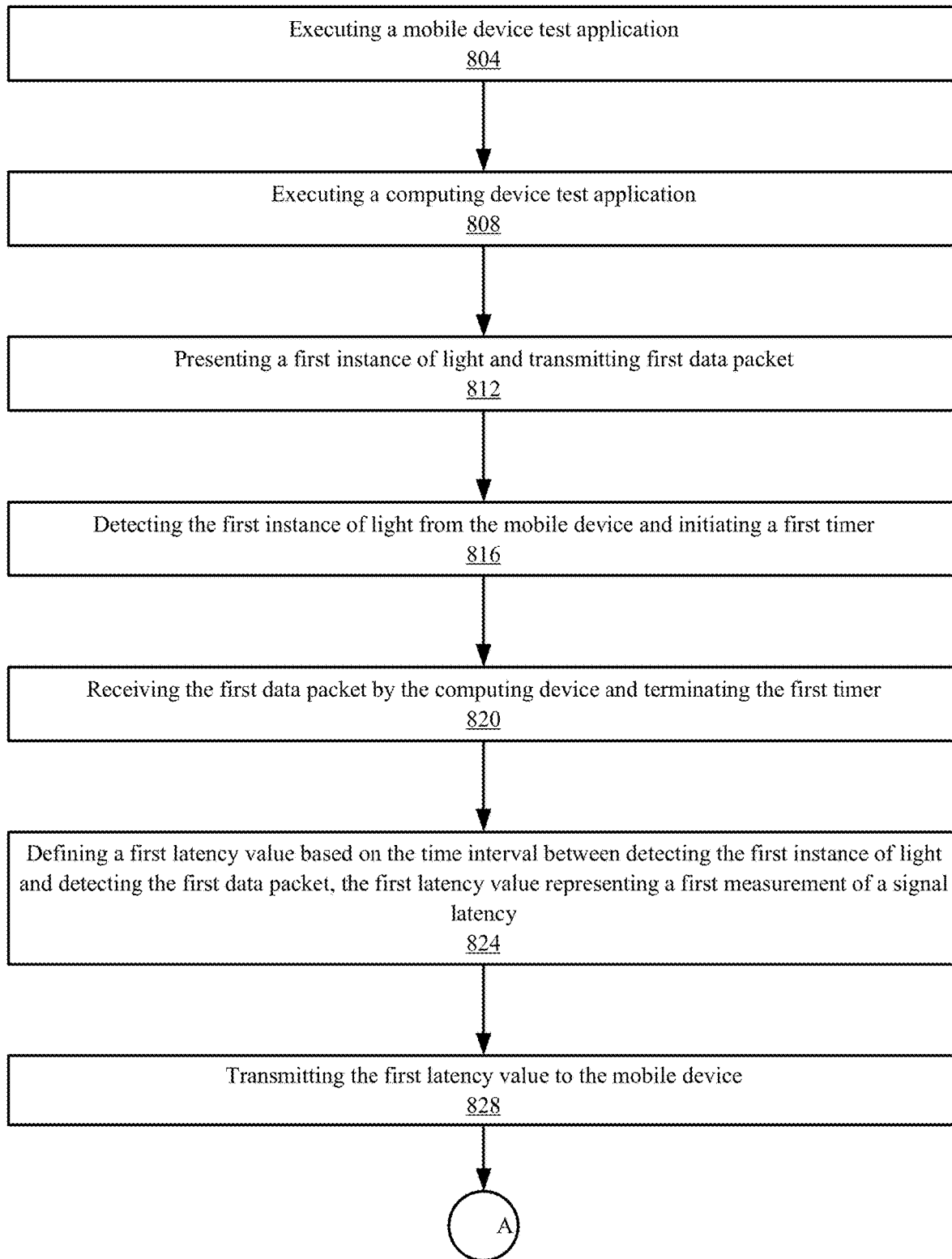
FIGS. 8A and 8B illustrate a flowchart of an example process for mitigating signal latency in connections between wireless devices according to aspects of the present disclosure.
Figure 8B:
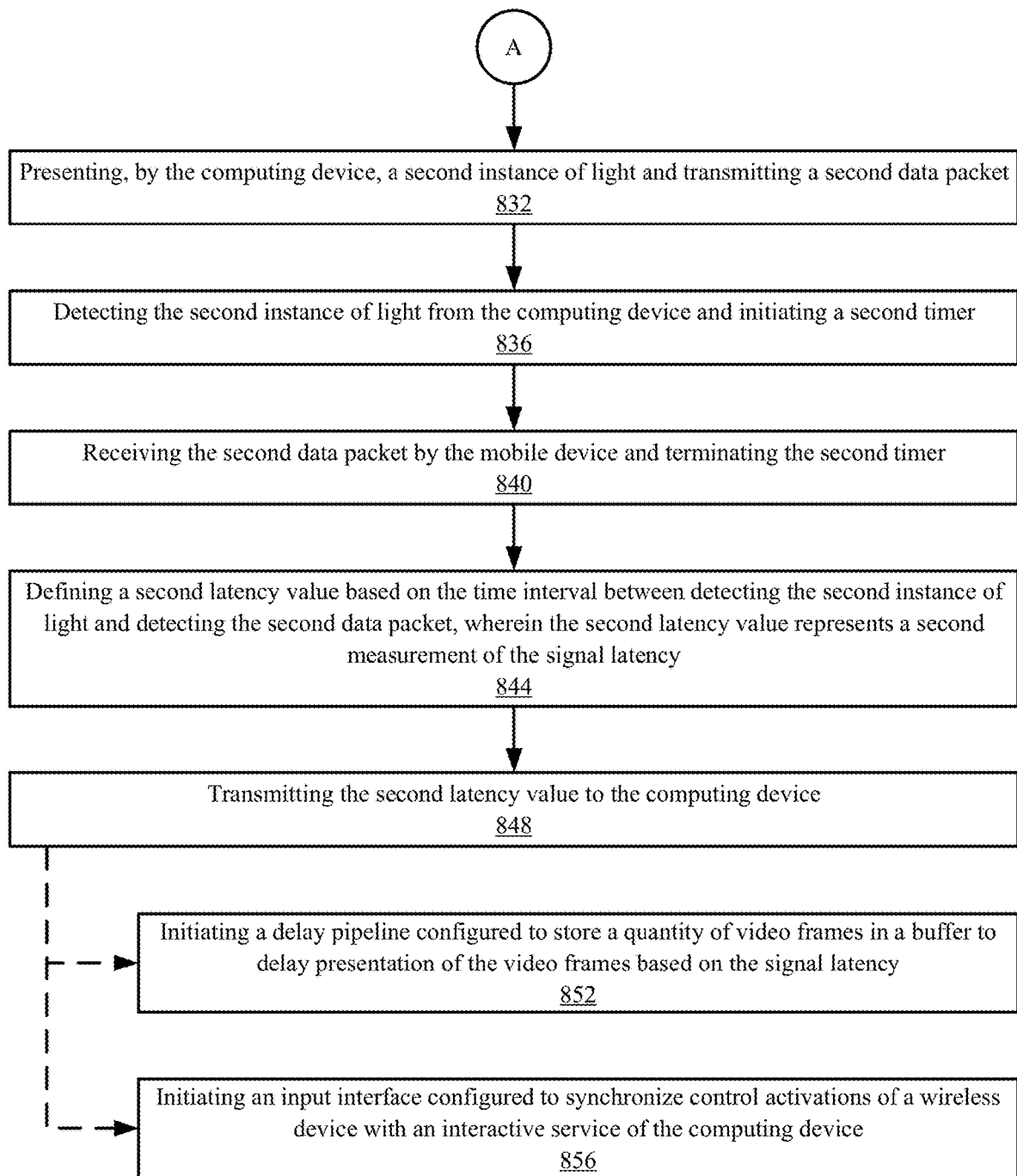

FIGS. 8A and 8B illustrate a flowchart of an example process for mitigating signal latency in connections between wireless devices according to aspects of the present disclosure. Signal latency may affect the time-sensitive operations of wireless devices such as device that synchronize operations with other wireless devices, interactive service (e.g., such as video games, or other services that are based on interaction with one or more wireless devices, and/or the like), and/or the like. The signal latency may correspond to the time interval between when a data packet is transmitted and when the data packet is received by the recipient wireless device. Many factors may affect the wireless connections such as, but not limited to, noise, interference (e.g., from other devices operating transceivers over the same or adjacent channels, environmental factors (e.g., temperature, humidity, barriers between the mobile device and the computing device, material composition of the barriers, etc.), and/or the like. The example process of FIG. 8A and FIG. 8B may be used to measure a signal latency and/or mitigate that signal latency in connections between a computing device (e.g., a personal computer, mobile device such as smartphone or tablet, display device such as a computer monitor or television, projector, and a wireless device (e.g., mobile device; wireless headphones; wireless controller such as a video game controller, keyboard, mouse, and/or any other device configured for use in interacting with a process of the computing device; wireless speakers; computing device; and/or the like). The computing device and wireless device may each include a wireless transceiver configured to communicate with each other over a predetermined wireless communication protocol such as, but not limited to, Wi-Fi, Bluetooth, Zigbee, Z-wave, Thread, Wireless M-BUS, or the like.

At block 804, a mobile device may execute a test application configured to measure a signal latency of a connection between the mobile device and a computing device. The mobile device may execute the test application upon establishing the connection to the computing device. The mobile device may also execute the test application one or more additional times while the mobile device (and/or other wireless devices) is connected to the computing device to update the signal latency measurement. For example, the test application may be executed when a connection is first established, based on user input, upon detecting that an operation of the computing is no longer synchronized with the mobile device or other wireless device, in regular intervals, based on characteristics of the connection between the computing device and the mobile device or other wireless device, and/or the like.

At block 808, the computing device may execute a test application stored in memory of the computing device and configured to measure a signal latency of a connection between the mobile device and the computing device. In some instances, the test application may execute prior to, after, or at the same time as the test application executed by the mobile device. The test application of the computing device may include the same functionality and execute under the same conditions as the test application of the mobile device. In some examples, the computing device and the mobile device may synchronize execution of the respective test applications. In those examples, the mobile device and/or the computing device may transmit data packets indicating when to execute the test applications. Alternatively, or additionally, the mobile device and/or the computing device may use an event handler configured to trigger execution of the test application upon detection of predetermined events.

In some examples, the process may be initiated by the computing device. The computing device may display an image directing a user to execute the test application on the mobile device. Alternatively, the computing device may transmit a data packet to the mobile device causing the mobile device to execute the test application. Alternatively, the mobile device may initiate the process by transmitting a data packet to the computing device causing the computing device to execute the test application. The user may select, which device (e.g., the computing device or the wireless device) is to generate the first measurement. If the computing device is to generate the first measurement, then the computing device may then wait for sensor input from the mobile device. If the mobile device is to generate the first measurement, then the computing device may present a dark image (e.g., pixels having an average pixel value of approximately zero or below a predetermined threshold, etc.).

At block 812, the mobile device may present a first instance of light and approximately simultaneously transmit a first data packet to the computing device. The first instance of light may be generated by a camera flash, one or more light emitting diodes (LEDs) of the mobile device, presenting via a display of the mobile device pixels with an average pixel value of approximately 255, and/or the like.

In some instances, the first instance of light may include light emitted at a particular wavelength of the electromagnetic spectrum (e.g., blue with a wavelength of 450-485 nanometers, green with a wavelength of 500-565 nanometers, etc.) to improve the accuracy of detecting the first instance of light. For example, the wavelength may be based on an average wavelength of ambient light of the environment of the mobile device or computing device. The wavelength may be select so as to be distinguishable from the average wavelength of the ambient light of the environment. Alternatively, the wavelength may be selected by the device configured to detect the second instance of light (i.e., the mobile device, etc.).

At block 816, the computing device may detect the first instance of light using an optical sensor. If the first instance of light includes light emitted at particular wavelengths, the optical sensor may be tuned to detect light of those particular wavelengths. The computing device may generate and store a first timestamp corresponding to the time in which the first instance of light is detected. Alternatively, or additionally the computing device may initiate a timer when the first instance of light is detected.

At block 820, the computing device may receive the first data packet from the mobile device. The data packet may be received at some time after the first instance of light is detected due to the distance over which the data packet traveled from the mobile device to the computing device (i.e., the signal latency). The computing device may generate and store a second timestamp corresponding to the time in which the data packet is received. Alternatively, or additionally, the computing device may terminate the timer and store a timer value corresponding to the time of the timer when the timer terminated.

At block 824, the computing device may define a first latency value based on the first timestamp and the second timestamp. Alternatively, or additionally, the first latency value may be based on timer value. The first latency value may represent a first measurement of a signal latency of the connection between the mobile device and the computing device.

At block 828, the computing device may transmit the first signal latency value to the mobile device. The mobile device may use the signal latency to maintain a synchronization with the computing device. For example, the signal latency may be used to execute a mitigation process by the mobile device to synchronize operations of the mobile device with operations of the computing device. In other examples, the signal latency may be used to determine when the detection process is to be re-executed. For instance, a subsequent signal latency value may be received from the computing device and compared with the first signal latency value. If the first signal latency and subsequent signal latency differ by more than a threshold amount, then blocks 812-828 may be executed again to generate a new first latency value representing a current signal latency of the connection between the computing device and the mobile device.

FIG. 8B continues the process at block 832, where a reciprocal detection process may be executed. The computing device may present a second instance of light and simultaneously or near-simultaneously transmit a second data packet to the mobile device. The second instance of light may be presented by a camera flash, one or more light emitting diodes of the mobile device, displaying one or more frames of pixels with an average pixel value of approximately 255, and/or the like.

In some instances, the second instance of light may include light emitted at a particular wavelength of the electromagnetic spectrum (e.g., blue with a wavelength of 450-485 nanometers, green with a wavelength of 500-565 nanometers, etc.) to improve the accuracy of detecting the first instance of light. For example, the wavelength may be based on an average wavelength of ambient light of the environment of the mobile device or computing device. The wavelength may be select so as to be distinguishable from the average wavelength of the ambient light of the environment. Alternatively, the wavelength may be selected by the device configured to detect the second instance of light (i.e., the mobile device, etc.).

At block 836, the mobile device may detect the second instance of light using an optical sensor. If the second instance of light includes light emitted at particular wavelengths, the optical sensor may be tuned to detect light of those particular wavelengths. The mobile device may generate and store a third timestamp corresponding to the time in which the second instance of light is detected. Alternatively, or additionally the mobile device may initiate a timer when the second instance of light is detected.

At block 840, the mobile device may receive the data packet from the computing device. The data packet may be received at some time after the flash of light is detected due to the signal latency. The mobile device may generate and store a fourth timestamp corresponding to the time in which the data packet is received. Alternatively, or additionally, the computing device may terminate the timer and store a timer value corresponding to the time of the timer when the timer terminated.

At block 844, the mobile device may define a second latency value based on the third timestamp and the fourth timestamp. Alternatively, or additionally, the second latency value may be based on the timer value. The second latency value may represent a second measurement of a signal latency of the connection between the mobile device and the computing device.

At block 848, the mobile device may transmit the second latency value. The computing device may use the second latency value to derive an overall latency value. For example, the overall latency value may correspond to an average of the first latency value and the second latency value. Alternatively, the overall latency value may correspond to a highest latency value selected from among the first latency value and the second latency value. Alternatively, such as when blocks 812-848 are executed over multiple iterations to generate multiple first latency values and multiple second latency values, the overall latency value may be derived by a statistical analysis of the multiple first latency values and the multiple second latency values.

In some examples, blocks 812-828 may execute in parallel with blocks 832-848. For example, the first instance of light may be presented (and the first data packet transmitted) by the mobile device at approximately the same time as the second instance of light is presented (and the second data packet transmitted) by the computing device. The computing device may define the first latency value while the mobile device is defining the second latency value.

In some examples, the computing device may determine whether to execute either blocks 812-824 or blocks 832-848. In those examples, the computing device may derive a single latency value (e.g., the first latency value if blocks 812-824 are selected and the second latency value if blocks 832-848 are selected). The computing device may use the single latency value rather than two latency values. Alternatively, the computing device may execute either blocks 812-824 or blocks 832-848 over multiple iterations to derive multiple latency values.

The signal latency of the connection between the computing device and the mobile device may be approximately equal to the signal latency of other connections maintained by the computing device that are using a same communication protocol as the connection between the computing device and the mobile device. The first latency value, the second latency value, and/or the overall latency value may be usable to perform mitigation processes that may improve the operations of the computing device and the mobile device as well as the computing device and other wireless devices connected to the computing device. For example, the mobile device may be usable to derive latency values for other wireless devices that lack the components to perform one or more of blocks 812-848 such as wireless headphones that may lack optical sensors or LEDs. Once the first latency value, the second latency value, and/or the overall latency value is derived, the computing device may execute one or more mitigation processes that may improve the operations of the computing device and the wireless headphones.

At block 852, a first mitigation process may be executed by the computing device. The first mitigation process may initiate a delay pipeline to synchronize the audio components and the video components. The delay pipeline may include a buffer configured to store video frames from the video component of the media. The buffer may be a FIFO buffer that, once filled, outputs the oldest video frame each time a new video frame is stored in the buffer. The buffer may be instantiated to a size that corresponds to the signal latency, the resolution of the video frames, and the frame rate such that the quantity of video frames stored corresponds to the quantity of video frames that would be displayed over the time interval that is the signal latency. The buffer may cause the video component to be delayed according to the time interval corresponding to the signal latency. By delaying the video component, the corresponding audio component is given time to be received by the mobile device (or other wireless devices) synchronizing the audio component and the video component of the media.

Alternatively, the computing device may advance the audio component based on the time interval of the signal latency. The computing device may present the portion of the video component of the media stream that corresponds to time T. The computing device may transmit the portion of the transmit the audio component that corresponds to time T+L (where L corresponds to the time interval of the signal latency). By the time, the audio component is received by the mobile device (or other wireless devices), the computing device may be presenting the portion of the video component that corresponds to time T+L such that the audio component presented by the mobile device (or other wireless devices) and the video component presented by the computing device are synchronized.

At block 856, a second mitigation process may be executed for wireless devices configured to interact with the computing device. The computing device may execute an interactive service configured to operate based on input received from one or more wireless devices (e.g., wireless controllers, etc.). Signal latency may cause input from the one or more wireless devices to be processed after the state of the interactive service has changed. For example, a video game interactive service may include a character aiming a weapon at a moving target, a wireless controller may be used to adjust the aim of the weapon and cause the weapon to fire. A control activation of the wireless controller (e.g., a button actuation, joystick adjustment, and/or the like) may occur when the weapon is aimed at the target. By the time the interactive service receives an indication that the control activation occurred, the state of the interactive service may have changed such that the weapon is no longer aimed at the target causing the interactive service to record a miss.

The second mitigation process may initiate an input interface (or modify a current input interface) that processes input from the wireless device. The interactive service may generate a state data structure that corresponds to the state of the interactive service (e.g., the absolute or relative coordinates of objects, targets, characters, etc.; position and/or orientation of the point of view being presented, the coordinate in which a weapon or the like is being aimed, coordinates of a curser or the like, state of an virtual environment of the interactive service, and/or any other characteristic and/or property usable to recreate the state of the interactive service at a particular time). The state data structure may include an identifier (e.g., usable to address the state data structure and/or to order two or more state data structures into a sequence), a timestamp, and/or the like.

The interactive service may be configured to generate a state data structure in regular intervals. The interactive service may store a predetermined quantity of state data structures. In some instances, such as when the interactive service is configured to execute for long periods of time, the interactive service may periodically remove the oldest state data structure to avoid storing too many states in memory. For example, the interactive service may store a quantity of state data structures that were generated over a time interval equal to the signal latency. When a new state data structure is generated, the interactive service may delete the oldest state data structure.

The input interface may receive an indication of a control activation and pass the indication to the interactive service with an identification of a particular state data structure (e.g., by identifier, timestamp, etc.) in which the control activation occurred. The interactive service may then process the control activation by modifying the particular state data structure (and potentially the state data structures generated after the particular state data structure up to a current time) such that the control activation is processed as if it is received when the state of the interactive service corresponded to the particular state data structure.

For example, the input interface may receive an indication of a control activation by the wireless device (e.g., at time T). The input interface may then determine the state of the interactive service when the control activation actually occurred (e.g., when the control was activated at the wireless controller at time T−L). The input interface passes the indication of the control activation and an identification of the state data structure and/or the timestamp corresponding to state of the interactive service when the control activation actually occurred. The interactive service then determines what the state of the interactive service (e.g., based on the corresponding state data structure) would have been if the control activation was processed when the control activation actually occurred. Returning to the example above, the interactive service may determine if at time (T+L)−L, a control activation would cause the weapon to hit the target. If so, then the interactive service processes the input from the wireless controller as if the target was hit.

In some instances, the input may be recorded at the current time T (e.g., the time corresponding to when the indication of the control activation is received), while the effect of the control activation may be determined based on the state of the interactive service at the time in which the control activation actually occurred. In other instances, the input may be recorded at the time in which the control activation actually occurred (e.g., time T−L). In those instances, the second mitigation process may modify the particular state data structure that corresponds to the time in which the control activation actually occurred. The second mitigation process may also modify one or more additional state data structure between the particular state data structure and a state data structure that corresponds to the current time T.

The computing device may execute one or more mitigation processes based on the capabilities of the wireless devices connected to the computing device and/or the services provided by the computing devices. For example, the first mitigation process may be executed for devices configured to present a component of media to be synchronized with other components of the media presented by the computing device. The second mitigation process may be executed for devices configured to interact with an interactive service of the computing device.

Figure 9:
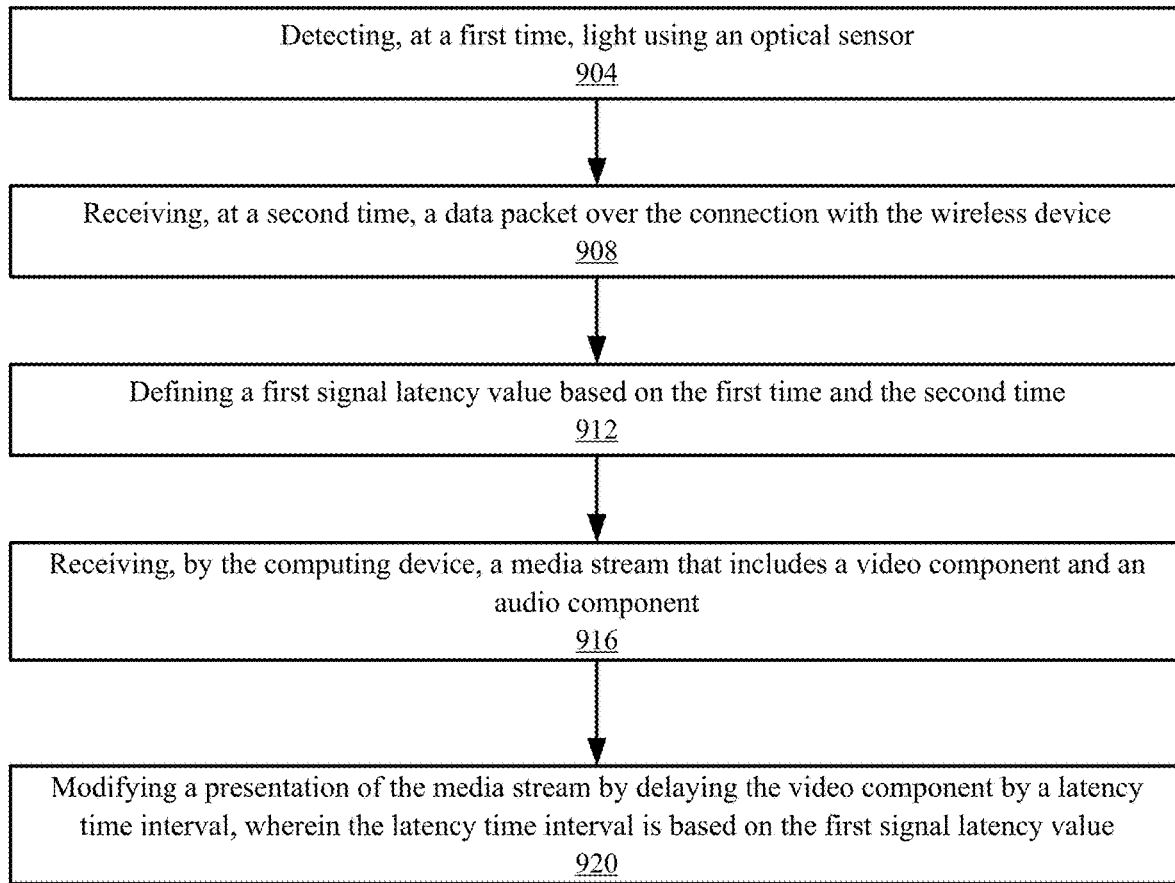
FIG. 9 illustrates a flowchart of another example process for mitigating signal latency in connections between wireless devices and a computing device according to aspects of the present disclosure.

FIG. 9 illustrates a flowchart of another example process for mitigating signal latency in connections between first wireless devices and a computing device according to aspects of the present disclosure. A connection may be established between a computing and a first wireless device using a communication protocol to facilitate measurement of a signal latency the connection between the computing device and the first wireless device as well as other devices operating. The computing device may be a device configured to present media (e.g., such as, but not limited to, a personal computer, a mobile device such as a smartphone or tablet, television, display device, and/or the like). The computing device may include one or more wireless transceivers configured to communicate with the first wireless device over one or more communication protocols (e.g., Wi-Fi, Bluetooth, Zigbee, Z-wave, etc.). A connection may be established using a handshaking protocol (e.g., such as a pairing process) or other process involving a unilateral transmission or exchange of data packets.

The first wireless device may be a device configured to measure signal latency of a connection with the computing device and/or a device configured to present a component of media to be presented by the computing device such as the audio component or video component or a device configured to measure signal latency. For example, the first wireless device may be wireless headphones or a wireless speaker (configured to present an audio component of media), a mobile device, another computing device, etc.

At block 904, the computing device detects light using an optical sensor. The source of the light may be one or more LEDs, a camera flash, a display (e.g., presenting a predetermined quantity of pixels having an average red, green, and blue values that are approximately 255 or a presenting a predetermined quantity of pixels having an average intensity value that is approximately 255, etc.), and/or the like of the first wireless device or another, nearby device. For example, the computing device may detect light based on the intensity of the light being emitted relative to the ambient light in the environment within which the computing device is located. In some examples, the computing device may be configured to detect a particular wavelength or frequency band of light. In those examples, the particular wavelength or frequency band may be selected based on an analysis of ambient light in the environment such that the wavelength or frequency of light presented can be detected over the ambient light in the environment. For example, the light source may detect an average wavelength of the ambient light of the environment and emit light in a different wavelength to ensure the light will be detected by the computing device.

The computing device may store a first timestamp (e.g., referred to as the first time) corresponding to the time in which the light is detected. Alternatively, or additionally, the computing device may initiate a timer upon detecting the light. The computing device may detect the light nearly instantaneously from when the light is emitted from the light source (e.g., due to the proximity of the light source from the computing device and the speed of light). The timestamp and/or timer may indicate the beginning of a first event usable to determine the signal latency of the connection with the first wireless device.

At block 908, the computing device may receive a data packet from the first wireless device. The first wireless device may emit the light and transmit the data packet at approximately the same time. The data packet may be indicative of a second event usable along with the first event to determine the signal latency. The computing device may store a second timestamp (e.g., referred to as the second time) corresponding to the time in which the data packet is received. Alternatively, or additionally, the computing device may terminate the timer (if such a timer was initiated upon detecting the light) and store a timer value corresponding to the value of the timer when the timer was terminated.

At block 912, the computing device may define a first signal latency value based on the first time and the second time (e.g., the first timestamp and the second timestamp, etc.). Alternatively, the computing device may define the first signal latency value based on the timer value. The first signal latency value may represent a time interval over which a data packet travels from the wireless controller to the computing device.

In some instances, blocks 904-912 may be executed a predetermined quantity of iterations to derive a corresponding predetermined quantity of first signal latency values. The computing device may then process the predetermined quantity of first signal latency values to derive an overall signal latency value (e.g., using one or more statistical algorithms, an average, a median, a mode, etc.). Generating additional first signal latency values may increase the accuracy of the signal latency value by preventing outlier measurements from biasing the of the overall signal latency value.

In some instances, additional blocks may be executed to further increase the accuracy of the signal latency value. The computing device may emit light (e.g., using a LEDs, a light bulb, a cameral flash, a display of the computing device, etc.) and transmit a data packet to the first wireless device. The first wireless device may detect the light and generate a third timestamp (and/or initiate a timer). When the first wireless device receives the data packet, the first wireless device may generate a fourth timestamp (and/or terminate the timer). The first wireless device may then define a second signal latency value based on the third time stamp and the fourth time stamp. Alternatively, or additionally, the first wireless device may define a second signal latency value based on the value of the timer when the timer was terminated. In some examples, this process may be repeated a predetermined quantity of iterations to derive a corresponding predetermined quantity of second signal latency values. The first wireless device may transmit the second signal latency value to the computing device.

At block 916, the computing device may receive a media stream that includes a video component and an audio component. The computing device may be configured to transmit the media stream or a component thereof to one or more wireless devices (e.g., the first wireless device, a second wireless device, etc.). For example, the computing device may present the video component and transmit the audio component to a wireless speaker. The computing device may determine the capabilities of connected devices to determine which component of the media stream to transmit to the connected device. The computing device may determine the capabilities of a connected device based on an identification of the connected device provided by the connected device and/or from user input.

Upon connecting to a second wireless device configured to present the media stream and/or a component thereof, the computing device may begin transmission of the media stream and/or the component thereof to the second wireless device. The second device may be the first wireless device or another wireless device. For example, the first wireless device may be configured to measure a signal latency for the computing device to enable the computing device to improve presentation of media streams when using other wireless devices that may lack the ability to measure the signal latency. In some instances, the computing device may connect to multiple second wireless devices, which may be of a homogenous or heterogenous device type. Once the signal latency is measured, the first wireless device may disconnect or return to an idle state while the computing device transmits the media stream or the component thereof to the other wireless devices.

At block 920, the computing device may modify a presentation of the media by delaying the video component to be displayed by the computing device by a time interval based on the first signal latency. The computing device may instantiate a buffer to store video frames prior to being displayed by the computing device. The buffer may be a FIFO buffer that, once filled, outputs the oldest video frame in the buffer each time a new video frame is stored in the buffer. The buffer may be instantiated to a size based on the signal latency, the resolution of the video frames, and the frame rate such that the quantity of video frames stored corresponds to the quantity of video frames that would be displayed over the time interval that is the signal latency.

The computing device may transmit the audio component to the second wireless device while presenting the delayed video component. Since the audio component is not being delayed (other than by the signal latency), the computing device transmits the audio at time T while presenting the video component corresponding to time T−L (where L is the signal latency). By the time the audio component is received by the wireless device (e.g., at time T+L), the wireless device can present the audio component that corresponds to time T, while the computing device is presenting the video component that corresponds to (T−L)+L=T. As a result, the computing device enables the audio component presented by the wireless device to be synchronized with the video component being presented by the computing device.

Alternatively, the computing device may advance the audio component based on the time interval of the signal latency. The computing device may present the video component corresponding to time T. The computing device may transmit the audio component that corresponds to time T+L. By the time, the audio component is received by the wireless device (e.g., at time T+L), the wireless device can present the audio component corresponding to T+L while the computing device is now presenting the video component corresponding to T+L.

In some instances, the computing device and the first wireless device may use sound in place of or in addition to light. The first wireless device may present an audio segment (e.g., having a predetermined frequency or sequence of frequencies, volume or sequence of volumes, etc.) and transmit the data packet at approximately the same time. The computing device may detect the audio segment and generate the first timestamp (and/or initiate the timer). The computing device may generate the second timestamp (and/or terminate the timer) when the data packet is received. The signal latency value may correspond to the first timestamp and the second timestamp (or timer value) as previously described.

The computing device may also use sound to generate an updated signal latency value during presentation of the media stream. During operation, the computing device may present the media stream or component thereof (e.g., such as only the video component), while transmitting another the component of the media stream to the second wireless device (e.g., such as just the audio component, etc.). The computing device may use sound to generate updated signal latency value without interrupting the media stream or component thereof being presented by the computing device or the second wireless device. While presenting a media stream, the computing device may present an audio segment and approximately simultaneously transmit a data packet. The audio segment may be presented at a predetermined frequency or predetermined sequence of frequencies expected by the second wireless device. In some examples, the predetermined frequency or predetermined sequence of frequencies may be outside the frequency range of human hearing (e.g., less than 20 Hz or greater than 20 kHz, etc.). Alternatively, or additionally, the audio segment may be presented at a predetermined volume that can be distinguishable from the audio component of the media stream.

Figure 10:
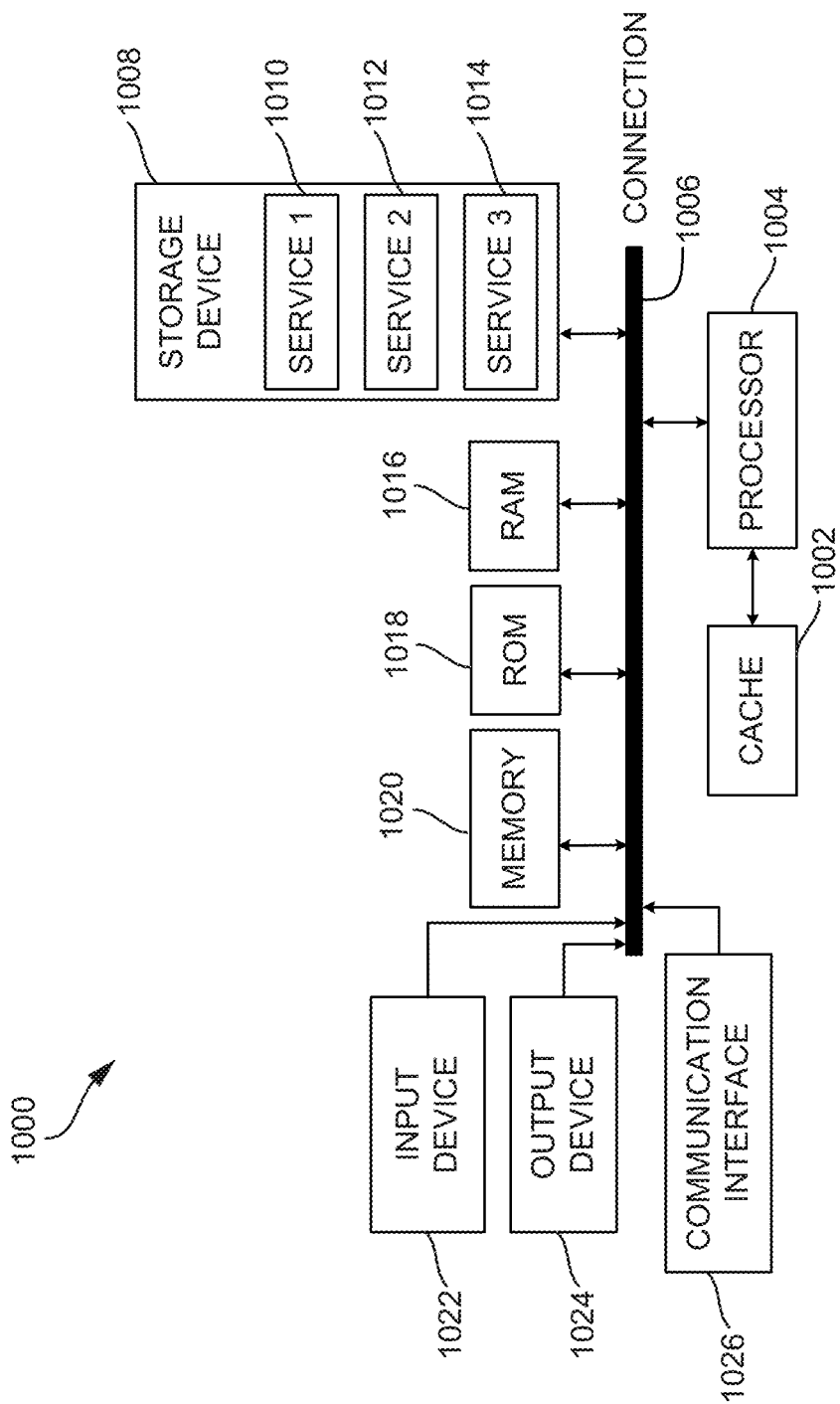
FIG. 10 illustrates an example computing device architecture of an example computing device that can implement the various techniques described herein according to aspects of the present disclosure.

FIG. 10 illustrates an example computing device according to aspects of the present disclosure. For example, computing device 1000 can implement any of the systems or methods described herein. In some instances, computing device 1000 may be a component of or included within a media device. The components of computing device 1000 are shown in electrical communication with each other using connection 1006, such as a bus. The example computing device architecture 1000 includes a processor (e.g., CPU, processor, or the like) 1004 and connection 1006 (e.g., such as a bus, or the like) that is configured to couple components of computing device 1000 such as, but not limited to, memory 1020, read only memory (ROM) 1018, random access memory (RAM) 1016, and/or storage device 1008, to processing unit 1010.

Computing device 1000 can include a cache 1002 of high-speed memory connected directly with, in close proximity to, or integrated within processor 1004. Computing device 1000 can copy data from memory 1020 and/or storage device 1008 to cache 1002 for quicker access by processor 1004. In this way, cache 1002 may provide a performance boost that avoids delays while processor 1004 waits for data. Alternatively, processor 1004 may access data directly from memory 1020, ROM 817, RAM 1016, and/or storage device 1008. Memory 1020 can include multiple types of homogenous or heterogeneous memory (e.g., such as, but not limited to, magnetic, optical, solid-state, etc.).

Storage device 1008 may include one or more non-transitory computer-readable media such as volatile and/or non-volatile memories. A non-transitory computer-readable medium can store instructions and/or data accessible by computing device 1000. Non-transitory computer-readable media can include, but is not limited to magnetic cassettes, hard-disk drives (HDD), flash memory, solid state memory devices, digital versatile disks, cartridges, compact discs, random access memories (RAMs) 1025, read only memory (ROM) 1020, combinations thereof, or the like.

Storage device 1008, may store one or more services, such as service 1 1010, service 2 1012, and service 3 1014, that are executable by processor 1004 and/or other electronic hardware. The one or more services include instructions executable by processor 1004 to: perform operations such as any of the techniques, steps, processes, blocks, and/or operations described herein; control the operations of a device in communication with computing device 1000; control the operations of processing unit 1010 and/or any special-purpose processors; combinations therefor; or the like. Processor 1004 may be a system on a chip (SOC) that includes one or more cores or processors, a bus, memories, clock, memory controller, cache, other processor components, and/or the like. A multi-core processor may be symmetric or asymmetric.

Computing device 1000 may include one or more input devices 1022 that may represent any number of input mechanisms, such as a microphone, a touch-sensitive screen for graphical input, keyboard, mouse, motion input, speech, media devices, sensors, combinations thereof, or the like. Computing device 1000 may include one or more output devices 1024 that output data to a user. Such output devices 1024 may include, but are not limited to, a media device, projector, television, speakers, combinations thereof, or the like. In some instances, multimodal computing devices can enable a user to provide multiple types of input to communicate with computing device 1000. Communications interface 1026 may be configured to manage user input and computing device output. Communications interface 1026 may also be configured to managing communications with remote devices (e.g., establishing connection, receiving/transmitting communications, etc.) over one or more communication protocols and/or over one or more communication media (e.g., wired, wireless, etc.).

Computing device 1000 is not limited to the components as shown if FIG. 10. Computing device 1000 may include other components not shown and/or components shown may be omitted.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
   detecting, at a first time, a first particular sound or light segment;
   receiving, by a display device, a first data packet over a connection with a first wireless device, wherein the first data packet is received at a second time;
   defining, by the display device, a first signal latency value based on the first time and the second time, wherein the first signal latency value corresponds to an estimated quantity of time before data transmitted by the display device is received at the first wireless device;
   receiving, by the display device, a media stream that includes a video component and an audio component; and
   modifying, by the display device, a presentation of the media stream by advancing the audio component by a latency time interval, wherein the latency time interval is based on the first signal latency value.

2. The method of claim 1, further comprising:
   presenting, at a third time, a second particular sound or light segment;
   transmitting, at the third time, a second data packet, wherein the second data packet is configured to be received at a fourth time; and
   receiving, over the connection with the first wireless device, a second signal latency value that is based on the third time and the fourth time, wherein the first signal latency value is further based on the second signal latency value.

3. The method of claim 1, further comprising:
   transmitting, to a second wireless device, the audio component of the media stream, wherein the audio component, upon being received by the second wireless device, is synchronized with the video component.

4. The method of claim 1, wherein the first particular sound or light segment is detected by a microphone of the first wireless device.

5. The method of claim 1, wherein the first particular sound or light segment is detected by an optical sensor of the first wireless device.

6. The method of claim 1, wherein a frequency of the first particular sound or light segment is outside a frequency range of human perception.

7. The method of claim 1, further comprising:
   determining that the first wireless device has disconnected; and
   modifying the presentation of the media stream by delaying the audio component by the latency time interval to resynchronize the video component and the audio component of the media stream.

8. A system comprising:
   one or more processors; and
   a machine-readable storage medium storing instructions that when executed by the one or more processors, cause the one or more processors to perform operations including:
      detecting, at a first time, a first particular sound or light segment;
      receiving, by a display device, a first data packet over a connection with a first wireless device, wherein the first data packet is received at a second time;
      defining, by the display device, a first signal latency value based on the first time and the second time, wherein the first signal latency value corresponds to an estimated quantity of time before data transmitted by the display device is received at the first wireless device;
      receiving, by the display device, a media stream that includes a video component and an audio component; and
      modifying, by the display device, a presentation of the media stream by advancing the audio component by a latency time interval, wherein the latency time interval is based on the first signal latency value.

9. The system of claim 8, wherein the operations further include:
   presenting, at a third time, a second particular sound or light segment;
   transmitting, at the third time, a second data packet, wherein the second data packet is configured to be received at a fourth time; and
   receiving, over the connection with the first wireless device, a second signal latency value that is based on the third time and the fourth time, wherein the first signal latency value is further based on the second signal latency value.

10. The system of claim 8, wherein the operations further include:
    transmitting, to a second wireless device, the audio component of the media stream, wherein the audio component, upon being received by the second wireless device, is synchronized with the video component.

11. The system of claim 8, wherein the first particular sound or light segment is detected by a microphone of the first wireless device.

12. The system of claim 8, wherein the first particular sound or light segment is detected by an optical sensor of the first wireless device.

13. The system of claim 8, wherein a frequency of the first particular sound or light segment is outside a frequency range of human perception.

14. The system of claim 8, wherein the operations further include:
    determining that the first wireless device has disconnected; and
    modifying the presentation of the media stream by delaying the audio component by the latency time interval to resynchronize the video component and the audio component of the media stream.

15. A non-transitory machine-readable storage medium of a display device storing instructions that when executed by one or more processors, cause the one or more processors to perform operations including:
    detecting, at a first time, a first particular sound or light segment;
    receiving, by a display device, a first data packet over a connection with a first wireless device, wherein the first data packet is received at a second time;
    defining, by the display device, a first signal latency value based on the first time and the second time, wherein the first signal latency value corresponds to an estimated quantity of time before data transmitted by the display device is received at the first wireless device;
    receiving, by the display device, a media stream that includes a video component and an audio component; and
    modifying, by the display device, a presentation of the media stream by advancing the audio component by a latency time interval, wherein the latency time interval is based on the first signal latency value.

16. The non-transitory machine-readable storage medium of claim 15, wherein the operations further include:
presenting, at a third time, a second particular sound or light segment;
transmitting, at the third time, a second data packet, wherein the second data packet is configured to be received at a fourth time; and
receiving, over the connection with the first wireless device, a second signal latency value that is based on the third time and the fourth time, wherein the first signal latency value is further based on the second signal latency value.

17. The non-transitory machine-readable storage medium of claim 15, wherein the operations further include:
transmitting, to a second wireless device, the audio component of the media stream, wherein the audio component, upon being received by the second wireless device, is synchronized with the video component.

18. The non-transitory machine-readable storage medium of claim 15, wherein the first particular sound or light segment is detected by a microphone of the first wireless device.

19. The non-transitory machine-readable storage medium of claim 15, wherein a frequency of the first particular sound or light segment is outside a frequency range of human perception.

20. The non-transitory machine-readable storage medium of claim 15, wherein the operations further include:
determining that the first wireless device has disconnected; and
modifying the presentation of the media stream by delaying the audio component by the latency time interval to resynchronize the video component and the audio component of the media stream.

* * * * *